No. 658,832.
R. DANVIN.
DUST COLLECTOR.
(Application filed Mar. 13, 1899.)
Patented Oct. 2, 1900.
(No Model.)
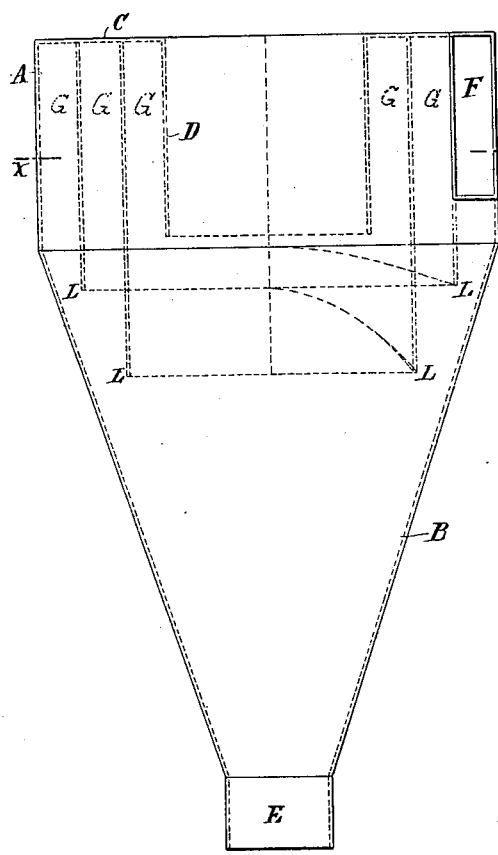
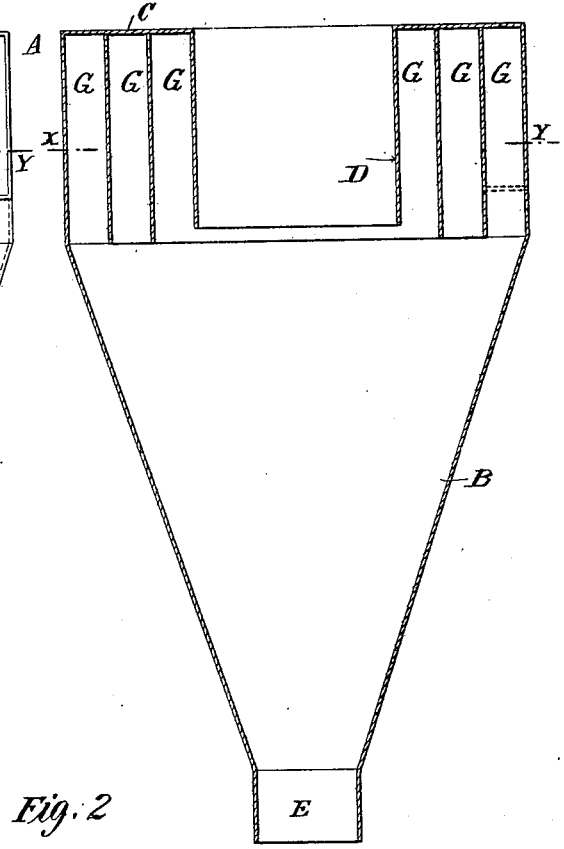
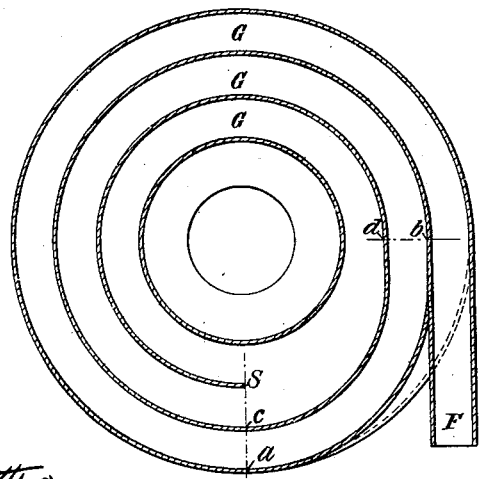
Witnesses:
Raphaël Ritter
C. D. Brown.
Roger Danvin, Inventor
by L. G. Laureau Att'y.

UNITED STATES PATENT OFFICE.

ROGER DANVIN, OF PARIS, FRANCE.

DUST-COLLECTOR.

SPECIFICATION forming part of Letters Patent No. 658,832, dated October 2, 1900.

Application filed March 13, 1899. Serial No. 708,791. (No model.)

*To all whom it may concern:*

Be it known that I, ROGER DANVIN, a citizen of the Republic of France, residing in Paris, France, have invented a new and useful Improvement in Dust-Collectors, of which the following is a specification.

My invention relates to that class of dust-collectors having a separating-chamber composed of a cylindrical portion above and a conical portion below. In such devices as usually constructed the dust-laden air enters the chamber through an opening which is tangential to the cylindrical part, and it escapes through the perforated top or cover of the chamber, while the separated dust is removed through an opening at the bottom of the conical portion. Sometimes a spiral flue, single or double, is placed in the chamber, the flue being oblong and closed at its bottom, except where occasional perforations or doors are introduced to remove the accumulated dust, the tangential inlet, as well as the air-outlet through the top of the chamber, being preserved. In another form a spiral conduit supplied with deflecting-plates is placed in the chamber; but the air-inlet is central and at the top, while the outlet is on one side of said chamber.

My improvement consists in introducing in the separating-chamber a single imperforate spiral conduit, the convolutions of which are entirely open at the bottom. This conduit is placed in the annular space comprised between the outer cylindrical wall of the chamber and a central sleeve through which the clean air escapes. It begins at an opening tangent to the cylindrical wall and divides the annular space into a certain number of convolutions, which depends upon the volume of air introduced and also upon the degree of efficiency required from the dust-collector.

In the accompanying drawings, forming part of this specification, Figure 1 is a vertical section of my apparatus. Fig. 2 is a horizontal section at X Y of Figs. 1 and 3. Fig. 3 shows another form of spirals.

As shown in the drawings, there is a cylindrical part A above a conical part B. An internal sleeve D, open at both ends, is riveted to the top or cover C of the chamber, so as to allow the clean air to escape. A spiral conduit G G G is riveted to the cover. It is open at the bottom and begins at an inlet F tangential to the wall of the chamber A. The convolutions stop at or near the point S. The dust-outlet is at E.

In the form as shown on Fig. 1 the lower edge of the open spiral conduit ends at or near the junction-line of the cylinder and the cone. In the form as shown on Fig. 3 the lower ends of the spirals are carried below this junction-line, each successive convolution reaching lower than the preceding one, though never low enough to touch the wall of the conical part, and in such a manner as to leave an open space L, through which the dust may be discharged, care being taken that the open spaces L be always of uniform section or, in other words, that in the circular portions the lower edge will be horizontal, following a plan perpendicular to the vertical axis of the apparatus, while in the portions which connect an upper convolution to a lower one—as, for instance, between points $a$ and $b$ and points $c$ and $d$—the curve of the lower edge will be such as to preserve the opening L uniform throughout with regard to the surface of the cone. The space between the last or inner spiral and the sleeve D should be substantially equal to the space between each of the outer spirals.

The operation of my device is similar in principle to that of all dust-collectors of the same class; but my proposed improvement by maintaining the centrifugal action necessary for separation in an unobstructed manner allows, with an apparatus of much smaller dimensions than usually employed, the thorough cleaning of the air and the precipitation of even the lightest materials, such as flour and similar substances. It also greatly simplifies the construction, while it insures greater efficiency.

I do not claim any of the combinations alluded to in the foregoing specification; but

I claim as my invention—

1. In a dust-collector, the combination of a separating-chamber having a cylindrical upper portion and a conical lower portion and having an air-outlet at the top and a dust-outlet at the bottom, with a single spiral conduit entirely detached from the central exit-sleeve, D, placed in the upper portion of the separating-chamber, said spiral conduit having an inlet substantially tangential to the cylindrical portion of said chamber and the walls of which are free from perforations or deflecting devices of any kind, the convolutions as well as the space between the last spiral and the central exit-sleeve being open at the bottom for the free discharge of air and dust, substantially as shown and specified.

2. In a dust-collector, the combination of a separating-chamber having a cylindrical upper portion and a conical lower portion and having an air-outlet at the top and a dust-outlet at the bottom, with a single spiral conduit entirely disconnected from the central exit-sleeve, D, placed in the upper portion of the separating-chamber, said spiral conduit having an inlet substantially tangential to the cylindrical portion of said chamber, the convolutions as well as the space between the last spiral and the central exit-sleeve being open at the bottom for the free discharge of air and dust, each successive spiral reaching lower into the conical portion of the separating-chamber, the openings, L, remaining substantially constant in their discharging-section, substantially as shown and described.

In testimony whereof I have hereunto set my hand in presence of two subscribing witnesses.

ROGER DANVIN.

Witnesses:
LOUIS SULLIGER,
EDWARD P. MACLEAN.